May 18, 1954  L. W. EVANS  2,678,888
METHOD OF ELIMINATING PHOSPHOR DISCOLORATION
IN CATHODE RAY TUBES
Filed Oct. 19, 1950

INVENTOR
LYLE W. EVANS
BY
ATTORNEY

Patented May 18, 1954

2,678,888

UNITED STATES PATENT OFFICE 2,678,888

METHOD OF ELIMINATING PHOSPHOR DISCOLORATION IN CATHODE RAY TUBES

Lyle William Evans, Seneca Falls, N. Y., assignor to Sylvania Electric Products Inc., a corporation of Massachusetts Application October 19, 1950, Serial No. 191,038

5 Claims. (Cl. 117—33.5)

This invention relates to improvements in depositing luminescent material on a solid surface to form a luminescent screen and to a method for forming such screens.

In the operation of cathode ray tubes it has long been noticed that a discoloration of the screen takes place after the tube has been operated for a short period of time, that is to say, about 24 to 48 hours. This discoloration darkens the screen and under certain conditions can be most objectionable particularly when the cathode ray tube is used for television viewing purposes.

The object of this invention is to overcome this discoloration problem.

Another object of this invention is to provide an improved method of depositing luminescent material onto a solid surface.

A still further object of this invention is to form a luminescent screen which is not subject to discoloration during tube operation.

In accordance with my invention these and other advantages which are incidental to its application can be obtained by incorporating a small amount of potassium permanganate in the settling solution from which the phosphor is being deposited upon a solid surface.

In the accompanying drawings, which illustrate the settling technique used in a preferred example of a method of settling luminescent screens embodying features of this invention:

Figure 1:
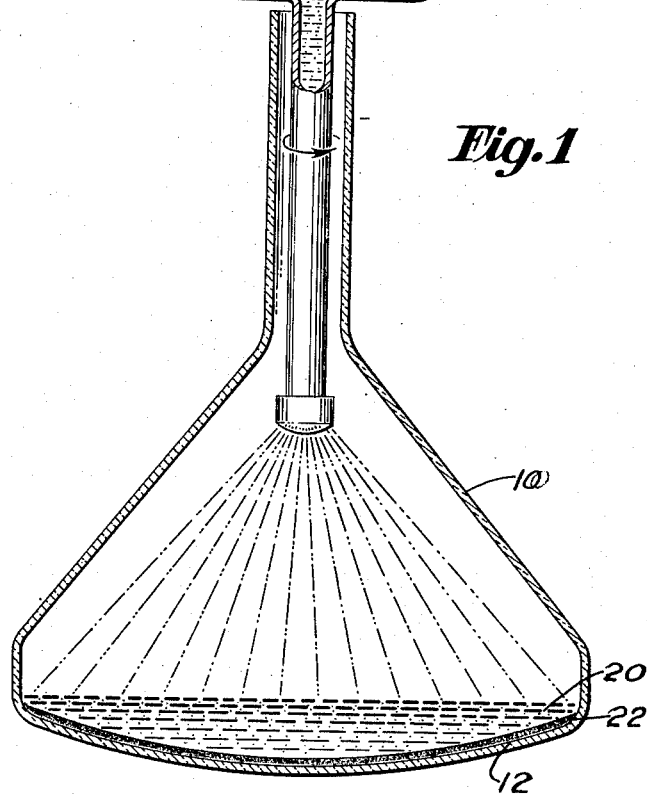
Figure 1 is a front elevation partly in section of a cathode ray tube blank and a spray type funnel.
Figure 2:
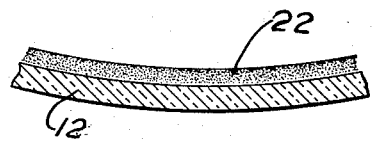
Figure 2 shows an enlarged cross-sectional portion of a phosphor screen.

It has been found that the principles of this invention can be incorporated successfully in any of the settling processes at present used for the application of phosphor material to a solid surface. Most of these processes make use of a binder and gelling agent in the settling solutions.

The method has been found to be applicable in the manufacture of substantially all inorganic luminescent material screens such as sulfide, oxide, tungstate, aluminate or silicates of one or more metals consisting of zinc, cadmium, beryllium, magnesium, manganese, calcium, strontium and others known to the art.

The particular binder or gelling agent used in conjunction therewith is also not of any particular importance. Any of the well-known binders and gelling agents normally used in accordance with prior art techniques are applicable. Good examples of the most common binding agents being the silicates such as sodium and potassium silicates which can readily be gelled with the aid of ammonium compounds such as ammonium carbonate, ammonium sulphate, ammonium chloride, etc., or acids such as phosphoric and boric acids and other organic and inorganic materials well known in the art of colloid chemistry.

The ingredient whose presence in the settling solution at the time of the settling operation which has been found to be essential if proper results are to be obtained wherein no discoloration will take place is potassium permanganate. This material may be incorporated in the solution in varying amounts which are not critical the preferred range being from 2.5 to 15% provided, of course, that the proper ratios and concentrations of the binder and gelling agents are used. The concentrations of these latter two ingredients are of course governed by the same considerations governing the production of a luminescent screen in accordance with prior art techniques and the expression here and above used of proper ratios and concentrations does not refer to a particular ratio and concentration adapted particularly for use with the permanganate.

The drawing which illustrates a preferred method of settling a screen incorporating the concepts of this invention shows a typical bulb 10 with a substantially flat surface 12 onto which the phosphor is to be settled. In accordance with this method as shown in the drawing, a cushion solution 20 consisting of water containing potassium permanganate is first introduced into the tube 10 whereupon a mixture of a binder such as potassium silicate, a gelling agent such as acetic acid and a phosphor suspension consisting of a sulfide phosphor in suspension as shown at 15 is introduced in the method illustrated by the drawing these are being introduced into the bulb by means of a spray tip funnel 14. As the phosphor settles it forms a luminescent screen 22 as shown in the drawings.

It should, however, be clearly understood that the beneficial use of the permanganate is not limited to any particular mode of introducing the phosphor and/or binder and gell into the bulb whose wall is to be coated with the phosphor material. It is merely essential that the method be carried out in such manner that the potassium permanganate is present at the time the phosphor is actually being settled onto the solid surface. In order that best results may be obtained it is, of course, preferable that the permanganate be there as homogeneously as possible.

The following are given as specific examples in which the principles of this invention are incorporated:

*Example 1.*—3500 ml. of deionized or distilled water are first added to a clean 12½" bulb. To this is added 23.7 ml. of $KMnO_4$ at a concentration of approximately 10 gms./liter. To this one may then add simultaneously the three following solutions: the first containing 245 ml. potassium silicate 14% solids with a 1:3.5 mole ratio of $K_2O:SiO_2$, the second solution being made of 500 ml. of ammonium sulphate having a .5 molar concentration, and the third solution being made of 190 ml. of phosphor suspension having a concentration of 12.5 gms./liter to which is then added 600 ml. of deionized water to bring the concentration of the whole to its proper value and to rinse out the equipment.

*Example 2.*—3000 ml. of potassium silicate, .1 molar, 14% solids, 3000 ml. of acetic acid, .1 molar, 20.0 ml. of $KMnO_4$ 10 gms./liter and 337.5 ml. of phosphor suspension are simultaneously introduced into a clean 16" bulb. The phosphor is allowed to settle therefrom after which the suspending medium is decanted, the screens washed and baked out in a normal manner. The screens obtained in accordance with this process are not after normal operation subject to the discolorations such as are sometimes referred to as raster burns.

While specific examples have been given in describing details of this invention it is to be understood that they have been given merely by way of illustration and that the invention is not to be limited thereto.

What I claim is:

1. In the process for depositing an inorganic phosphor coating to form a cathode ray screen the steps comprising covering the surface on which the screen is to be formed with a dilute solution of potassium permanganate, distributing an aqueous dispersion of an inorganic phosphor, an alkali metal silicate solution and a gelling agent into said permanganate solution, allowing said phosphor to settle and deposit on said surface and removing the liquids from the surface onto which the screen has been settled, the amount of said potassium permanganate in the settling of said liquid being very small and in the nature of a trace of permanganate as compared with the total volume of said settling liquid.

2. In the process for depositing an inorganic phosphor coating to form a cathode ray screen the steps comprising distributing a dilute solution of potassium permanganate, an aqueous dispersion of an inorganic phosphor, an alkali metal silicate solution and a gelling agent onto the surface on which the screen is to be formed, allowing said phosphor to settle and deposit on said surface and removing the liquids from the surface onto which the inorganic phosphor has been settled, the amount of said potassium permanganate in the settling of said liquid being very small and in the nature of a trace of permanganate as compared with the total volume of said settling liquid.

3. In the process for depositing an inorganic phosphor coating to form a cathode ray screen the steps comprising covering the surface on which the screen is to be formed with a dilute solution of potassium permanganate, distributing an aqueous dispersion of an inorganic phosphor an alkali metal silicate solution and a gelling agent into said permanganate solution, allowing said phosphor to settle and deposit on said surface and removing the liquids from the surface onto which the screen has been settled, said permanganate being present as a very small percentage of the settling solution somewhat in the nature of a trace of permanganate as compared with the total volume of settling liquid.

4. In the process for depositing an inorganic phosphor coating to form a cathode ray screen the steps comprising distributing a dilute solution of potassium permanganate, an aqueous dispersion of an inorganic phosphor, an alkali metal silicate solution and acetic acid onto the surface on which the screen is to be formed allowing said phosphor to settle and deposit on said surface and removing the liquids from the surface onto which the inorganic phosphor has been settled, the amount of said potassium permanganate in the settling of said liquid being very small and in the nature of a trace of permanganate as compared with the total volume of said settling liquid.

5. In the process for depositing an inorganic phosphor coating to form a cathode ray screen the steps comprising distributing a dilute solution of potassium permanganate, an aqueous dispersion of an inorganic phosphor, a sodium silicate solution and acetic acid onto the surface on which the screen is to be formed, allowing said phosphor to settle and deposit on said surface and removing the liquids from the surface onto which the inorganic phosphor has been settled, the amount of said potassium permanganate in the settling of said liquid being very small and in the nature of a trace of permanganate as compared with the total volume of said settling liquid.

References Cited in the file of this patent

UNITED STATES PATENTS

| Number | Name | Date |
|---|---|---|
| 2,412,654 | Sadowsky | Dec. 17, 1946 |
| 2,451,590 | Tidik et al. | Oct. 19, 1948 |